United States Patent
Bowman et al.

(10) Patent No.: US 12,421,699 B2
(45) Date of Patent: *Sep. 23, 2025

(54) REMOTE-OPERATED FLUSHING SYSTEM

(71) Applicant: Mueller International, LLC, Atlanta, GA (US)

(72) Inventors: Clay Evan Bowman, Ooltewah, TN (US); Harold Thomas Mosley, Ooltewah, TN (US); Timothy Bain Ervin, Apison, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/975,274

(22) Filed: Dec. 10, 2024

(65) Prior Publication Data

US 2025/0101721 A1    Mar. 27, 2025

Related U.S. Application Data

(63) Continuation of application No. 18/789,386, filed on Jul. 30, 2024, which is a continuation of application
(Continued)

(51) Int. Cl.
*E03B 7/00* (2006.01)
*B08B 9/032* (2006.01)
(Continued)

(52) U.S. Cl.
CPC ............ *E03B 7/006* (2013.01); *B08B 9/0325* (2013.01); *C02F 1/008* (2013.01); *C02F 1/687* (2013.01);
(Continued)

(58) Field of Classification Search
None
See application file for complete search history.

(56) References Cited

U.S. PATENT DOCUMENTS

| | | |
|---|---|---|
| 12,253,507 B2 | 3/2025 | Clark et al. |
| 12,385,233 B2 | 8/2025 | Bowman et al. |
| | (Continued) | |

OTHER PUBLICATIONS

Gifford, P.; Official Action for European Patent Application No. 16804634.0, filed Jun. 6, 2016, mailed Apr. 3, 2025, 6 pgs.
(Continued)

*Primary Examiner* — Richard C Gurtowski
(74) *Attorney, Agent, or Firm* — Taylor Duma LLP (57) ABSTRACT

Example aspects of a remote-operated flushing system and a method of operating a flushing system are disclosed. The remote-operated flushing system can comprise a fluid routing assembly comprising a valve, the valve configurable in an open configuration, wherein fluid is permitted to flow through the fluid routing assembly, and a closed configuration, wherein the fluid is prohibited from flowing through the fluid routing assembly; and a control device configured to actuate the valve between the open configuration and closed configuration; a remote operation device wirelessly connected to the control device and configured to remotely operate the control device to control the actuation of the valve between the open configuration and closed configuration.

22 Claims, 6 Drawing Sheets

Related U.S. Application Data

No. 18/215,225, filed on Jun. 28, 2023, which is a continuation of application No. 16/930,962, filed on Jul. 16, 2020, now Pat. No. 11,725,366.

(51) Int. Cl.
| | |
|---|---|
| *C02F 1/00* | (2023.01) |
| *C02F 1/68* | (2023.01) |
| *C02F 1/70* | (2023.01) |
| *G01K 1/024* | (2021.01) |
| *G01L 19/00* | (2006.01) |
| *G01L 19/08* | (2006.01) |
| *C02F 101/12* | (2006.01) |

(52) U.S. Cl.
CPC .............. *C02F 1/70* (2013.01); *G01K 1/024* (2013.01); *G01L 19/0007* (2013.01); *G01L 19/086* (2013.01); *B08B 2209/032* (2013.01); *C02F 2101/12* (2013.01); *C02F 2201/005* (2013.01); *C02F 2209/008* (2013.01); *C02F 2209/02* (2013.01); *C02F 2209/03* (2013.01)

(56) References Cited

U.S. PATENT DOCUMENTS

| | | | |
|---|---|---|---|
| 2012/0298208 A1* | 11/2012 | Taylor | G05B 19/05 137/624.11 |
| 2014/0278246 A1* | 9/2014 | Clark | G01N 33/18 702/182 |
| 2024/0392541 A1 | 11/2024 | Bowman et al. | |

OTHER PUBLICATIONS

Bowman, Clay Evan; Notice of Allowance for U.S. Appl. No. 18/215,225, filed Jun. 8, 2023, mailed Apr. 30, 2025, 15 pgs.

* cited by examiner

REMOTE-OPERATED FLUSHING SYSTEM

REFERENCE TO RELATED APPLICATIONS

This application is a continuation of U.S. Application No. 18,215,225, filed Jun. 28, 2023, which is a continuation of U.S. application Ser. No. 16/930,962, filed Jul. 16, 2020, which issued as U.S. Pat. No. 11,725,366 on Aug. 15, 2023, each of which is hereby incorporated by reference herein in its entirety.

TECHNICAL FIELD

This disclosure relates to flushing systems. More specifically, this disclosure relates to a remotely-operable flushing system for fluid distribution systems.

BACKGROUND

Flushing systems can be used to periodically flush fluid from fluid systems, such as water systems. Flushing water systems can be done for a variety of reasons, including improving the quality of the water. Flushing systems are typically contained within a housing comprising a removable lid. To operate the flushing system, an operator must typically remove the lid from the housing and manually activate the flushing system. An operator must also typically be physically present to obtain various information related to fluid within the flushing system or the flushing system itself.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a remote-operated flushing system comprising a fluid routing assembly comprising a valve, the valve configurable in an open configuration, wherein fluid is permitted to flow through the fluid routing assembly, and a closed configuration, wherein the fluid is prohibited from flowing through the fluid routing assembly; a control device configured to actuate the valve between the open configuration and closed configuration; and a remote operation device wirelessly connected to the control device and configured to remotely operate the control device to control the actuation of the valve between the open configuration and closed configuration.

Also disclosed is a remote-operated flushing system comprising a fluid routing assembly comprising a valve, the valve configurable in an open configuration, wherein fluid is permitted to flow through the fluid routing assembly, and a closed configuration, wherein the fluid is prohibited from flowing through the fluid routing assembly.

Also disclosed is a method of operating a flushing system comprising providing a flushing system comprising a fluid routing assembly and a control device, the fluid routing assembly comprising a valve configurable in an open configuration, wherein fluid is permitted to flow through the fluid routing assembly, and a closed configuration, wherein the fluid is prohibited from flowing through the fluid routing assembly; remotely sending a control signal to a control device; and actuating the valve between the open configuration and closed configuration with the control device in response to the control signal.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a remote-operated flushing system and associated methods, systems, devices, and various apparatus. Example aspects of the remote-operated flushing system can comprise a valve configured to control fluid flow through the flushing system and a control device to allow remote operation of the valve. It would be understood by one of skill in the art that the flushing system is described in but a few exemplary embodiments among many. No particular terminology or description should be considered limiting on the disclosure or the scope of any claims issuing therefrom.

Figure 1A:
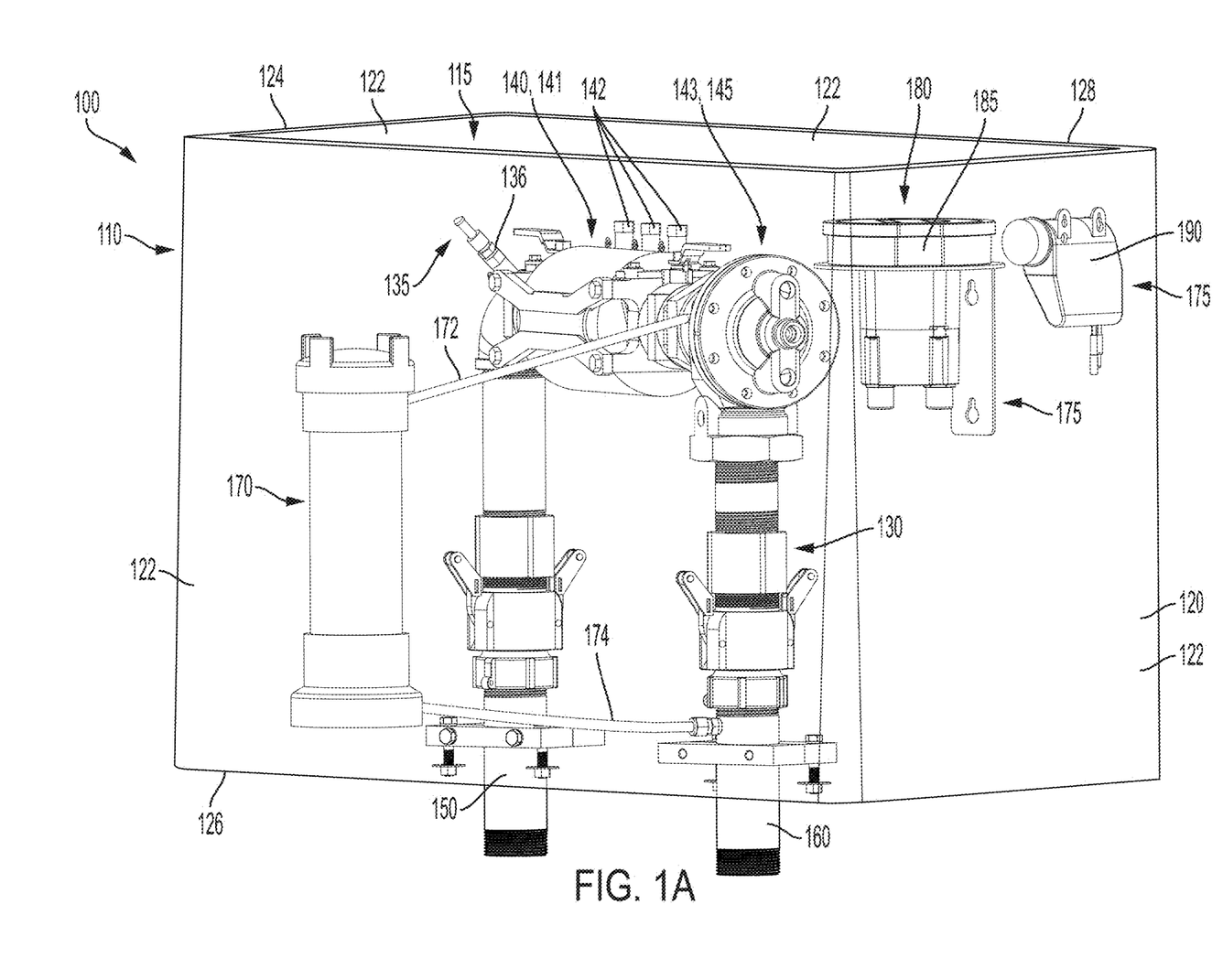
FIG. 1A is a perspective view of a flushing system, in accordance with one aspect of the present disclosure.
Figure 4:
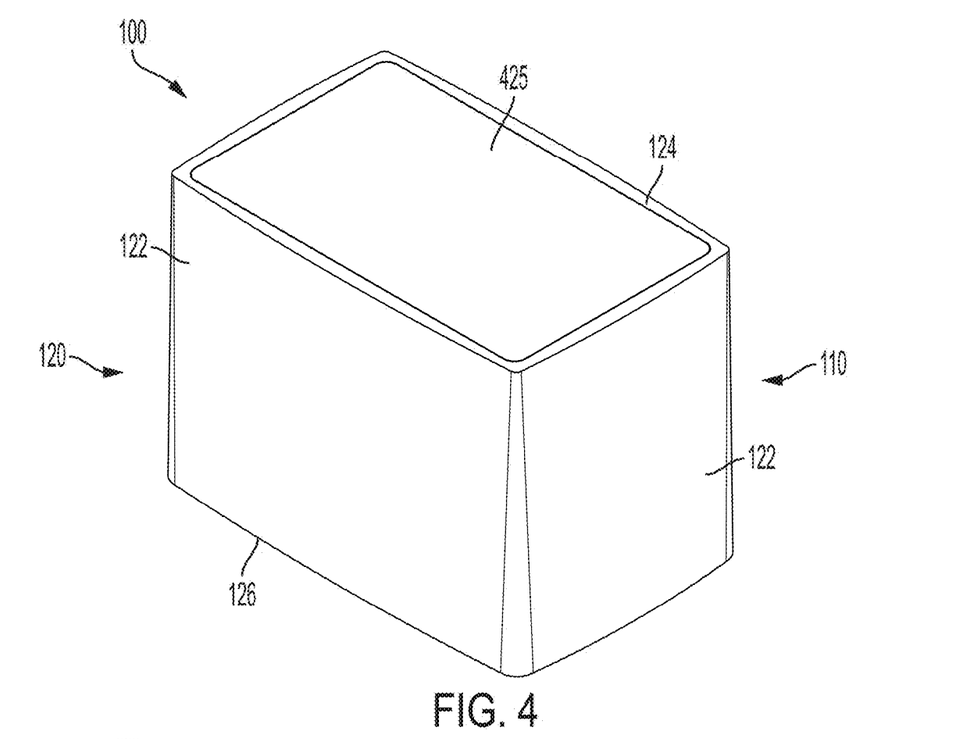
FIG. 4 is a top perspective view of a housing of the flushing system of FIG. 1A.

FIG. 1A is a perspective view of a flushing system 100, in accordance with one aspect of the present disclosure. The flushing system 100 can be configured to flush fluid, such as water, from a fluid system, such as, for example, a municipal water system, or any other fluid system where it may be desirable to periodically flush fluid out of the fluid system. For example, it may be desirable to flush stagnant or contaminated water out of the fluid system. As shown, example aspects of the flushing system 100 can comprise a housing 110 defining an interior cavity 115 within which various components of the flushing system 100 can be contained. In the present FIG. 1A, the housing 110 is illustrated as transparent for visibility of the components within the interior cavity 115. According to example aspects, the housing 110 can comprise a sidewall enclosure 120 comprising a plurality of sidewalls 122 and defining an upper end 124 and a lower end 126, relative to the orientation shown. In some aspects, an access opening 128 providing access to the interior cavity 115 can be formed at the upper end 124. The housing 110 can further comprise a lid 425 (shown in FIG. 4) oriented at the upper end 124 of the sidewall enclosure 120 and a base 129 (shown in FIG. 1B) oriented at the lower end 126 of the sidewall enclosure 120. As described in further detail below, in some aspects, the lid 425 can be configured to selectively uncover the access opening 128, as shown, and cover the access opening 128, as shown in FIG. 4. In example aspects, the housing 110 can be buried below or mostly below ground, and that the lid 425 can be oriented about flush with ground level. As such, the lid 425 can be removed from the sidewall enclosure 120 as needed, without the flushing system 100 extending above ground. Example aspects of the housing 110 can be formed from a composite material, a plastic material, such as polyvinyl chloride (PVC), a metal material, or any other suitable material or combination of materials known in the art.

According to example aspects, the flushing system 100 can comprise a substantially U-shaped fluid routing assembly 130 configured to route fluid from the fluid system through the flushing system 100. In other aspects, the fluid routing assembly 130 may not define a U-shape. Example aspects of the fluid routing assembly 130 can comprise a sampling port 135, a backflow preventer 140, and a valve 143. In example aspects, the valve 143 can be an adjustable flow valve 145, as shown, and can be configured to control the flow of fluid through the flushing system 100. In other aspects, the valve 143 can be any other suitable type of valve known in the art. Additionally, in example aspects, some or all of the internal components of the adjustable flow valve 145 can comprise a stainless steel material; however, in other aspects, the internal components of the adjustable flow valve 145 can comprise any other suitable material or combination of materials. An inlet pathway 150 can be provided for routing fluid into the fluid routing assembly 130 and an outlet pathway 160 can be provided for routing the fluid out of the fluid routing assembly 130. In the present aspect, fluid from the fluid system can flow into the flushing system 100 through the inlet pathway 150, past the sampling port 135, through the backflow preventer 140, through the adjustable flow valve 145, and out of the flushing system 100 through the outlet pathway 160. In some aspects, the fluid can further be configured to flow through a dechlorination unit 170.

As shown, the sampling port 135 can be oriented between the inlet pathway 150 and the backflow preventer 140.

According to example aspects, the sampling port 135 can comprise a sampling conduit 136 configured to dispense samples of the fluid in the fluid routing assembly 130 for testing the quality of the fluid. For example, the fluid can be tested for levels of lead, bacteria, nitrates, chlorine, pH levels, or the like. The fluid can be dispensed into a collection container and can be tested on site or taken to a testing facility. In some aspects, samples of the fluid can be obtained from the flushing system 100 even when the flushing system 100 is not actively flushing. In example aspects, the backflow preventer 140 can be oriented between the sampling port 135 and the adjustable flow valve 145. The backflow preventer 140 can be configured to allow fluid to flow therethrough in a first direction towards the outlet pathway 160, but can prevent the fluid from flowing in an opposite second direction back towards the inlet pathway 150. As such, the fluid in the fluid system can be protected from contamination by the fluid in the flushing system 100 backflowing into the fluid system. In the present aspect, the backflow preventer 140 can be a double check valve 141, though in other aspects, the backflow preventer 140 can define any other suitable configuration known in the art, such as an air gap. Example aspects of the backflow preventer 140 can comprise one or more relief valves 142, as shown. The relief valves 142 may be spaced apart along the backflow preventer 140 to relive air buildup within the backflow preventer 140 at various points.

According to example aspects, the adjustable flow valve 145 can be oriented between the backflow preventer 140 and the outlet pathway 160. The adjustable flow valve 145 can be configured to control the operation of the flushing system 100. For example, the adjustable flow valve 145 can be selectively oriented in an open configuration and a closed configuration. In the open configuration, fluid can flow through the adjustable flow valve 145, and the flushing system 100 can flush the fluid through the fluid routing assembly 130. In the closed configuration, the fluid can be prevented from flowing through the adjustable flow valve 145, and the flushing system 100 can thus be prevented flushing the fluid through the fluid routing assembly 130. Example aspects of the adjustable flow valve 145 can be a solenoid-operated adjustable flow valve 145, though in other aspects, the adjustable flow valve 145 can be a hydraulic adjustable flow valve, pneumatic adjustable flow valve, or any other suitable type of adjustable flow valve. In still other aspects, the valve 143 may not be an adjustable flow valve 145, and can instead comprise any other suitable type of valve known in the art. In aspects of the adjustable flow valve 145 that are solenoid-operated, a solenoid 146 (shown in FIG. 1B) can be configured to selectively either admit or release pressure into a main chamber of the adjustable flow valve 145, thus orienting the adjustable flow valve 145 in the closed and open configurations, respectively, in order to prevent or permit fluid flow through the adjustable flow valve 145, respectively. In some aspects, the adjustable flow valve 145 can further be oriented in any suitable number of partially-open configurations to selectively regulate the fluid flow through the adjustable flow valve 145. Example aspects of the adjustable flow valve 145 can further comprise a strainer therein configured to filter debris out the fluid flowing therethrough.

Figure 6:
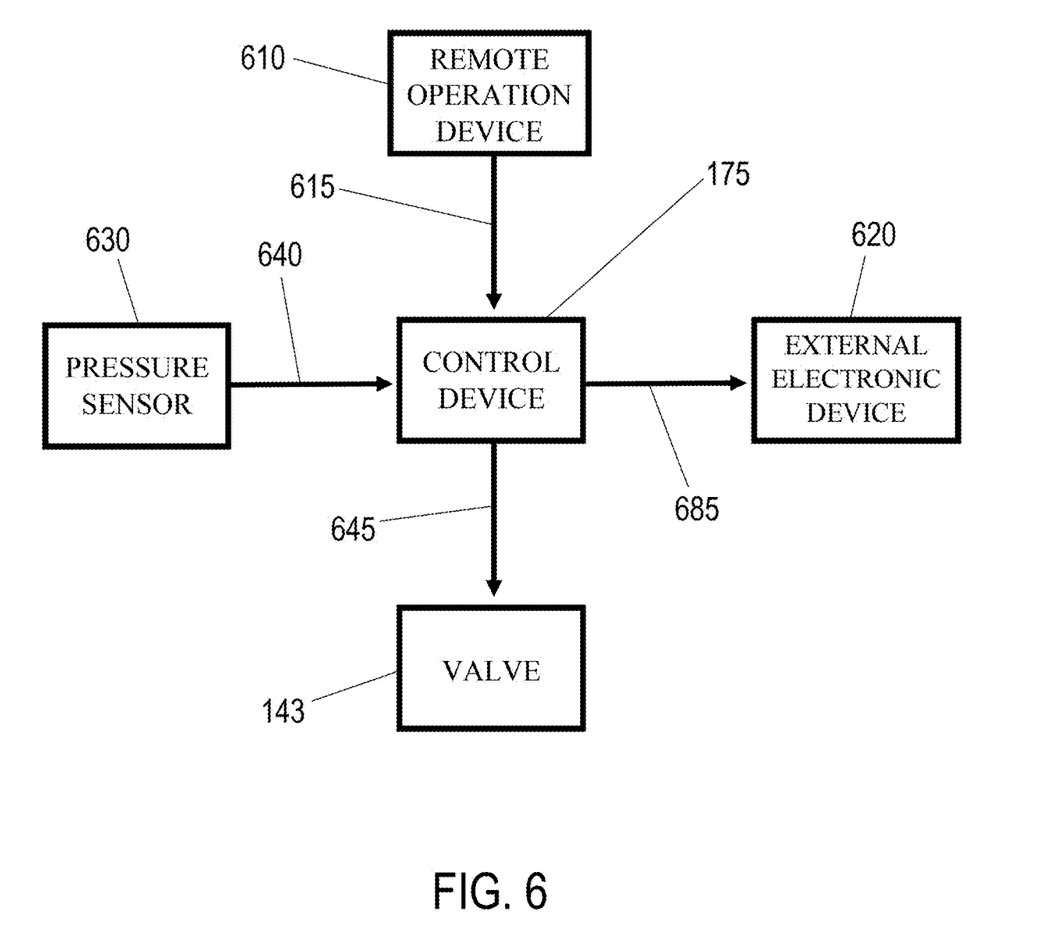
FIG. 6 is a system diagram illustrating a method of operating the flushing system of FIG. 1A.

Example aspects of the flushing system 100 can further comprise a control device 175 configured to allow an operator to remotely control the operation of the flushing system 100, i.e., to remotely control the selective orientation of the adjustable flow valve 145 in the open, closed, and partially-opened configurations, from a remote operation device 610 (shown in FIG. 6). In some aspects, such as the present aspect, the control device 175 can be completely wireless, while in other aspects, the control device 175 can be wired to the adjustable flow valve 145. For example, as shown, the flushing system 100 can comprise one or both of a pressure monitoring system 180 and a Bluetooth® controller 190, and one or both of the pressure monitoring system 180 and Bluetooth® controller 190 can serve as the control device 175. In some aspects, the control device 175 can also be configured to control the speed at which the adjustable flow valve 145 opens and closes, which can aid in preventing water hammer. Bluetooth® is one example of short distance wireless communication protocols, and can be used to implement personal-area networks (PANs) In aspects wherein the Bluetooth® controller 190 is the control device 175 and the adjustable flow valve 145 is solenoid-operated, the Bluetooth® controller 190 can be connected to the solenoid by one or more wires 147 (shown in FIG. 1B). In other aspects, the Bluetooth® controller 190 configured to wirelessly actuate the solenoid 146. Example aspects of the Bluetooth® controller 190 can also be wirelessly connected to the remote operation device 610, which can allow an operator to remotely send signals to the Bluetooth® controller 190 from the remote operation device 610. In other aspects, any other suitable wireless communication technique(s) may be implemented for remotely controlling the adjustable flow valve 145 with the control device 175.

The remote operation device 610 can be, for example, a mobile phone, tablet, computer, or the like. In example aspects, a program or app can be downloaded onto the remote operation device 610, through which the operator can send signals to the Bluetooth® controller 190. For example, the remote operation device 610 can be configured to send a control signal(s) 615 (shown in FIG. 6) to the Bluetooth® controller 190, and the Bluetooth® controller 190 can actuate the adjustable flow valve 145 in response to the control signal(s) 615. As such, an operator can remotely actuate the adjustable flow valve 145 with the remote operation device 610 in order to remotely operate the flushing system 100. Thus, the adjustable flow valve 145 of the flushing system 100 does not need to be physically accessed by an operator in order to be operated. Furthermore, the operator may be able to operate the flushing system 100 at a distance from Bluetooth® controller 190. For example, an operator may be able to operate the flushing system 100 from across the street from the flushing system 100. This can be beneficial in various instances, such as, for example, when the weather is poor and the operator wishes to stay inside their vehicle, or if the flushing system 100 is located in an area that is difficult to access. As shown in the present aspect, the Bluetooth® controller 190 can be mounted to the sidewall enclosure 120 of the housing 110, though in other aspects, the Bluetooth® controller 190 can be mounted at any suitable location within the interior cavity 115, including mounted to the fluid routing assembly 130, the lid 425, or the base 129. Some aspects of the Bluetooth® controller 190 may be configured to control various other features of the flushing system 100 and/or may be configured to communicate information, such as water quality information, to one or more external electronic device(s) 620 (shown in FIG. 6). In a particular example aspect, the external electronic device(s) 620 can be or include a computer at a remote operations center. Furthermore, in some aspects, the external electronic device(s) 620 can be or can include the remote operation device 610.

According to some example aspects, the flushing system 100 can also or alternatively comprise the pressure monitoring system 180. In some aspects, the pressure monitoring system 180 can be similar to the monitoring device disclosed in U.S. patent application Ser. No. 15/171,722, filed Jun. 2, 2016, which is hereby specifically incorporated by reference herein in its entirety. Example aspects of the pressure monitoring system 180 can comprise a pressure sensor 182 (shown in FIG. 1B) and a pressure monitoring unit 185. The pressure sensor 182 can be, for example, a piezo-resistive strain gauge, a capacitive gauge, an electromagnetic gauge, a piezoelectric device, or any other suitable device known in the art for detecting pressure. The pressure sensor 182 can be mounted within the fluid routing assembly 130 such that the pressure sensor 182, or a portion thereof, is in contact with the fluid therein. The pressure sensor 182 can be wired to the pressure monitoring unit 185 by one or more wires 183 (shown in FIG. 1B) and can transmit pressure data obtained by the pressure sensor 182 through the wires 183 to the pressure monitoring unit 185. In other aspects, the pressure sensor 182 may be configured to wirelessly transmit the pressure data to the pressure monitoring unit 185. In various aspects, the pressure sensor 182 can be configured to continually communicate pressure data to the pressure monitoring unit 185, while in other aspects, the pressure sensor 182 can communicate pressure data periodically or only when an anomaly is detected. The pressure monitoring unit 185 can be configured to evaluate the pressure data to determine whether a concern is present. For example, the pressure monitoring unit 185 may comprise a printed circuit board or other processing unit configured to process and evaluate the pressure data. Example aspects of the pressure monitoring unit 185 can also be configured to send a pressure signal 685 (shown in FIG. 6) representative of the detected pressure to a designated electronic device(s) 620, which may include the remote operation device 610, as described in further detail below. In instances wherein the pressure data presents a concern, the pressure monitoring unit 185 may be configured to send an alert signal to the designated electronic device(s) 620. Furthermore, in some aspects, the pressure monitoring unit 185 can be the control device 175 and can be configured to control the operation of the solenoid 146, and thus, the Bluetooth® controller 190 may not be required. As shown, the pressure monitoring unit 185 can be connected to the solenoid 146 by one or more wires 148, or may be wirelessly connected to the solenoid 146. In example aspects, the solenoid 146 can be connected to only one of the Bluetooth® controller 190 and the pressure monitoring unit 185, though in other aspects, the solenoid 146 may be connected to both. Moreover, in some aspects, the pressure monitoring unit 185 may be configured to control various other features of the flushing system 100 and/or may be configured to communicate information, such as water quality information, to the designated external electronic device(s) 620. As shown in the present aspect, the pressure monitoring unit 185 can be mounted to the sidewall enclosure 120 of the housing 110, though in other aspects, the pressure monitoring unit 185 can be mounted at any suitable location within the interior cavity 115, including mounted to the fluid routing assembly 130, the lid 425, or the base 129.

According to example aspects, the flushing system 100 can further comprise the dechlorination unit 170 received within the housing 110. In some aspects, the dechlorination unit 170 can be mounted to the housing 110, for example, to the sidewall enclosure 120, and in other aspects, the dechlorination unit 170 can be mounted to the fluid routing assembly 130. The dechlorination unit 170 can be configured to dechlorinate fluid as it flows therethrough. For example, in some aspects, the dechlorination unit 170 can comprise dechlorination tablets therein which can dechlorinate the fluid as the fluid passes over the dechlorination tablets. The dechlorination tablets can comprise sodium sulfite, ascorbic acid, or any other suitable substance for dechlorinating fluid. According to example aspects, some or all of the fluid being flushed through the flushing system 100 can be routed through the dechlorination unit 170 for dechlorination. As shown, the fluid can be transferred from the fluid routing assembly 130 to the dechlorination unit 170 through a dechlorination inlet conduit 172, and, once dechlorinated, the fluid can be transferred from the dechlorination unit 170 back to the fluid routing assembly 130 through a dechlorination outlet conduit 174. In the present aspect, the dechlorination inlet conduit 172 can extend from the valve 143 to the dechlorination unit 170, and the dechlorination outlet conduit 174 can extend from the dechlorination unit 170 to the outlet pathway 160, downstream of the valve 143. In some aspects, the dechlorination unit 170 may comprise a dechlorination valve that can be selectively adjusted to control the rate of dechlorination. According to example aspects, various local, state, or national standards may exist for the dechlorination of fluid flushed from a fluid system, and the dechlorination unit 170 can be designed to meet or exceed these standards.

Figure 1B:
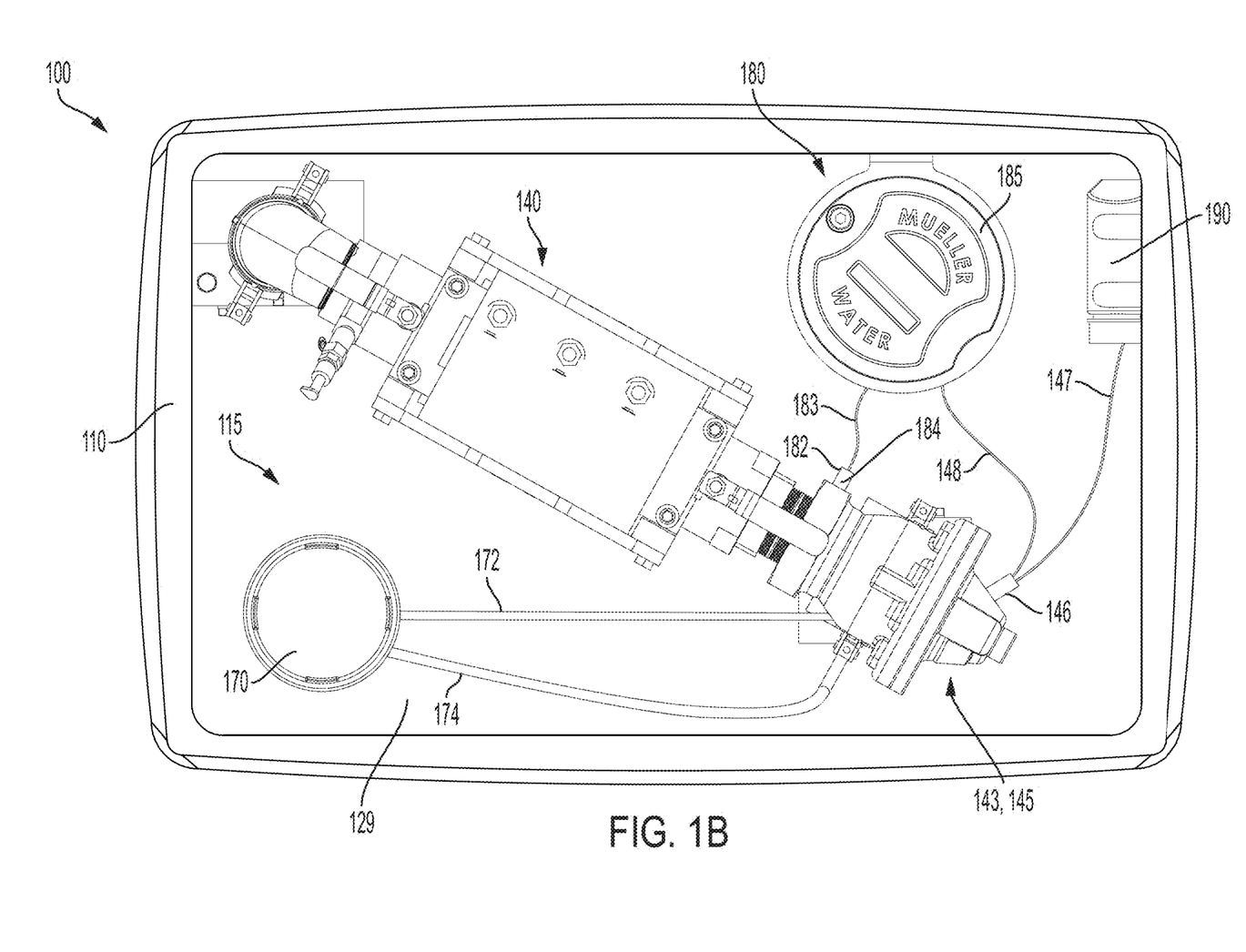
FIG. 1B is a top view of the flushing system of FIG. 1A.

FIG. 1B illustrates a top view of the flushing system 100, wherein the lid 425 (shown in FIG. 4) is removed for visibility into the interior cavity 115. As shown, the pressure sensor 182 can be mounted to the valve 143 at an, and the pressure monitoring unit 185 can be connected to the pressure sensor 182 by the wire 183. The pressure monitoring unit 185 can also be connected to the solenoid 146 by the wire 148. Some aspects of the flushing system 100 can also or alternatively include the Bluetooth® controller 190, which can be connected to the solenoid 146 by the wires 147. In other aspects, the pressure monitoring unit 185 may be wirelessly connected to either or both of the pressure sensor 182 and the solenoid 146 and/or the Bluetooth® controller 190 may be wirelessly connected to the solenoid 146.

Figure 2:
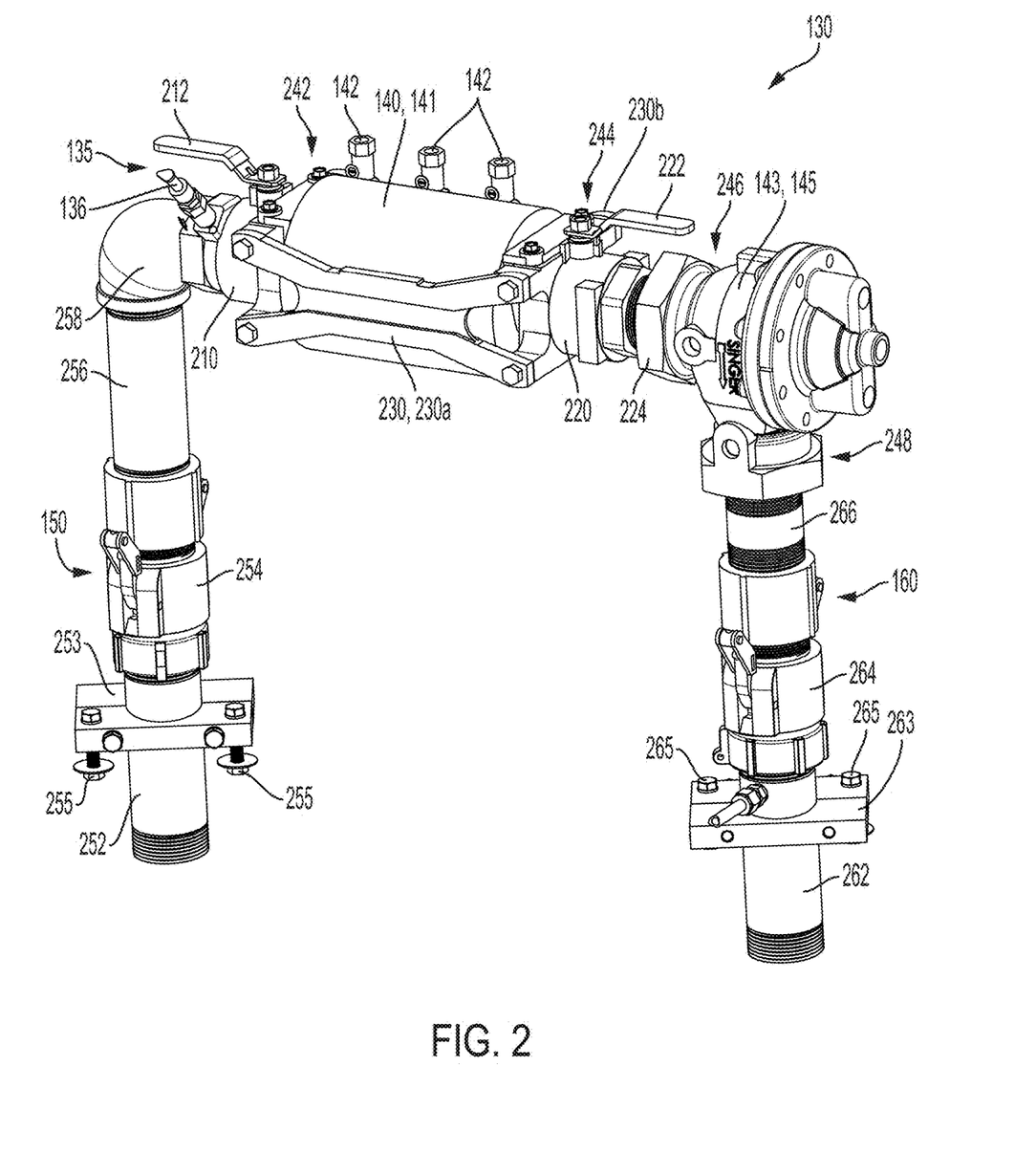
FIG. 2 is a top perspective view of a fluid routing assembly of the flushing system of FIG. 1A, wherein the fluid routing assembly comprises backflow preventer and a valve.

FIG. 2 illustrates a top perspective view of the fluid routing assembly 130. As shown, the inlet pathway 150 can comprise an inlet conduit 252 that can be connected to the fluid system and can provide a path for the fluid in the fluid system to enter the fluid routing assembly 130. The inlet conduit 252 can be configured to extend into the interior cavity 115 through an inlet opening 532 (shown in FIG. 5) formed in the base 129 (shown in FIG. 1B) of the housing 110 (shown in FIG. 1A). In some aspects, an inlet mounting bracket 253 can be mounted to the inlet conduit 252, and the inlet mounting bracket 253 can be attached to the base 129 to secure the inlet conduit 252 to the housing 110. As shown, one or more fasteners, such as nut and bolt fasteners 255, may be provided for securing the inlet mounting bracket 253 to the base 129. In example aspects, the inlet pathway 150 can be configured to extend substantially upward, relative to the orientation shown, towards the upper end 124 (shown in FIG. 1A) of the sidewall enclosure 120 (shown in FIG. 1A). As shown, in the present aspect, an inlet connector 254 can be provided for connecting the inlet conduit 252 to an inlet pipe 256. In some aspects, one or both of the inlet conduit 252 and inlet pipe 256 can be threadably coupled to the inlet connector 254. An inlet elbow fitting 258 can be coupled to the inlet pipe 256 and can define a bend angle of about 90°. As such, the fluid can flow from the fluid system into the inlet conduit 252, and can then flow through the inlet connector 254, inlet pipe 256, and inlet elbow fitting 258.

Example aspects of the inlet pathway 150 can comprise more or fewer components as needed to route the fluid to the backflow preventer 140.

Example aspects of the outlet pathway 160 can comprise an outlet conduit 262 that can provide a path for the fluid to exit the fluid routing assembly 130. In example aspects, the outlet conduit 262 can be connected to a fluid discharge location, such as sewage system, storm system, swale, retention system, or the like. In some aspects, as described above, the fluid flushed through the flushing system 100 can be routed through the dechlorination unit 170 (shown in FIG. 1A) prior to being discharged at the fluid discharge location. The outlet conduit 262 can be configured to extend into the interior cavity 115 through an outlet opening 534 (shown in FIG. 5) formed in the base 129 (shown in FIG. 1B) of the housing 110 (shown in FIG. 1A). In some aspects, an outlet mounting bracket 263 can be mounted to the outlet conduit 262, and the outlet mounting bracket 263 can be attached to the base 129 to secure the outlet conduit 262 to the housing 110. As shown, one or more fasteners, such as nut and bolt fasteners 265, may be provided for securing the outlet mounting bracket 263 to the base 129. According to some example aspects, the outlet pathway 160 can be configured to extend substantially upward, relative to the orientation shown, towards the upper end 124 of the sidewall enclosure 120. In the present aspect, the outlet pathway 160 can further comprise an outlet connector 264 for connecting the outlet conduit 262 to an outlet pipe 266. In some aspects, the outlet conduit 262 and outlet pipe 266 can be threadably coupled to the outlet connector 264. As such, as shown, the fluid in the flushing system 100 can exit the flushing system 100 by flowing into the outlet pipe 266, and then through the outlet connector 264 and the outlet conduit 262. Example aspects of the outlet pathway 160 can comprise more or fewer components as needed to route the fluid out of the flushing system 100. In other aspects, either or both of the inlet pathway 150 and outlet pathway 160 comprise any suitable configuration for routing the fluid into and out of the flushing system 100.

According to example aspects, a backflow preventer inlet 210 can oriented between and coupled to the inlet elbow fitting 258 and to an inlet end 242 of the backflow preventer 140, such that fluid can flow from the inlet elbow fitting 258, through the backflow preventer inlet 210, and into the backflow preventer 140. In some aspects, the backflow preventer inlet 210 can be threadably coupled to the inlet elbow fitting 258. As shown, the sampling port 135 extend from and can be in fluid communication with the backflow preventer inlet 210. As such, the sampling port 135 can be oriented proximate to the upper end 124 of the sidewall enclosure 120, such that the sampling port 135 can be easily accessed when the lid 425 is removed from the housing 110 to allow access to the interior cavity 115. In other aspects, however, the sampling port 135 can be oriented at any other suitable location in the flushing system 100. Additionally, as shown, the backflow preventer inlet 210 can comprise an inlet shutoff valve 212, such as a ball valve, which, in the present aspect, can be manually operated to selectively shut off fluid flow into the backflow preventer 140.

Example aspects of the fluid routing assembly 130 can further comprise a backflow preventer outlet 220 oriented between and coupled to an outlet end 244 of the backflow preventer 140 and an inlet end 246 of the adjustable flow valve 145. Thus, fluid can be configured to flow from the backflow preventer 140, through the backflow preventer outlet 220, and into the adjustable flow valve 145. Furthermore, as shown, the outlet pipe 266 of the outlet pathway 160 can be connected to an outlet end 248 of the adjustable flow valve 145, such that fluid can flow out of the adjustable flow valve 145 at the outlet end 248 and into the outlet pathway 160. In some aspects, the backflow preventer outlet 220 can be threadably coupled to a threaded valve connector 224, and the threaded valve connector 224 can be threadably coupled to the inlet end 246 of the adjustable flow valve 145. Similar to the backflow preventer inlet 210, the backflow preventer outlet 220 can comprise an outlet shutoff valve 222, such as a ball valve, which can be manually operated to selectively shut off fluid flow out of the backflow preventer 140. In other aspects, the inlet and outlet shutoff valves 212,222 may not be manually-operated, and may instead be automatically operated. Each of the backflow preventer 140 and adjustable flow valve 145 can be oriented proximate to the upper end 124 of the sidewall enclosure 120, to allow for easy access thereto through the access opening 128 for operation of the inlet and outlet shutoff valves 212,222 or for the repair or replacement of parts. Furthermore, according to some example aspects, the backflow preventer inlet 210 can be coupled to the backflow preventer outlet 220 by one or more connecting brackets 230. For example, as shown, the backflow preventer inlet 210 can be coupled to the backflow preventer outlet 220 by a first connecting bracket 230a and a second connecting bracket 230b. In the present view, the second connecting bracket 230b is largely hidden from view by the backflow preventer 140, but can be substantially the same as the first connecting bracket 230a.

Figure 3:
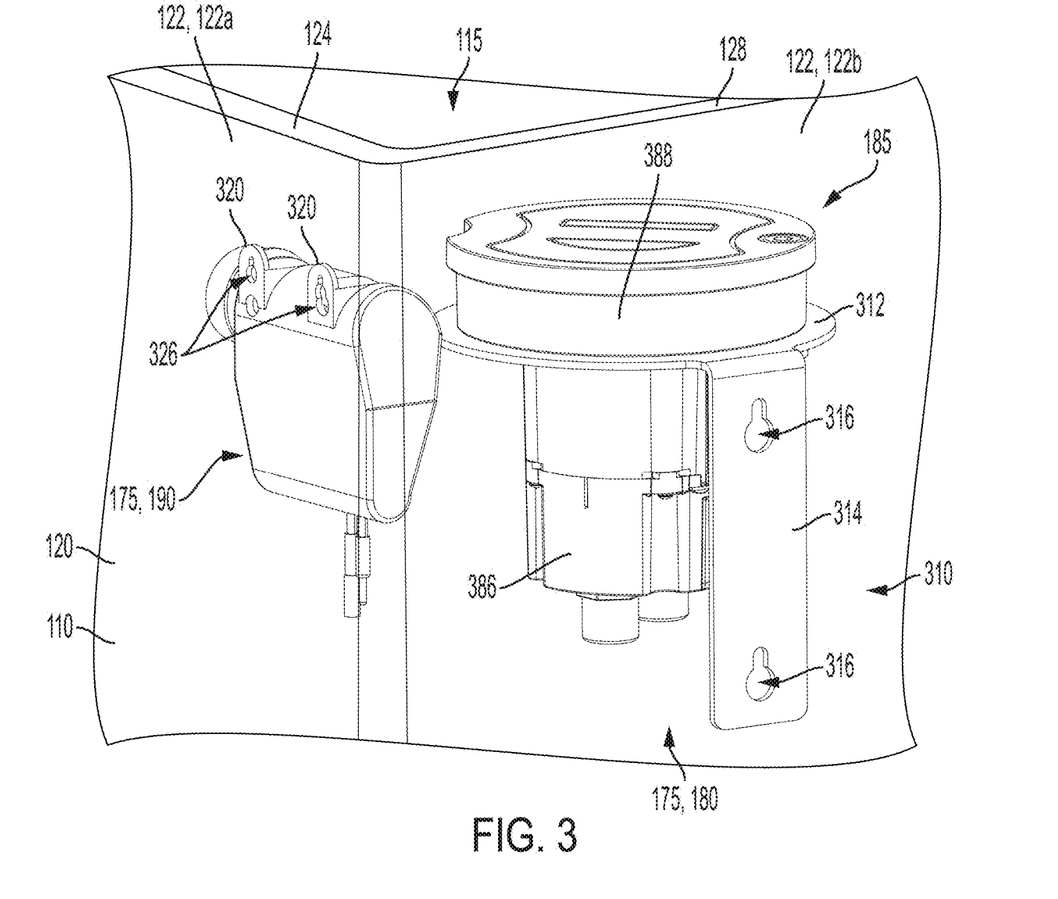
FIG. 3 is a rear perspective view of a pressure monitoring unit and a Bluetooth® controller of the flushing system of FIG. 1A.

FIG. 3 illustrates the Bluetooth® controller 190 and pressure monitoring unit 185 mounted to the sidewall enclosure 120 of the housing 110. The sidewall enclosure 120 is again illustrated as transparent for visibility into the interior cavity 115. As described above, other aspects of the flushing system 100 may comprise only one of the Bluetooth® controller 190 and the pressure monitoring unit 185. According to example aspects, the pressure monitoring system 180 can comprise an antenna configured to send pressure signals 685 (shown in FIG. 6) representative of the pressure data received from the pressure sensor 182 (shown in FIG. 1B) to a designated external electronic device(s) 620 (shown in FIG. 6), which as described, may be or may include the remote operation device 610. Optionally, the housing 110 can be formed from a non-ferrous material, so that the material does not interfere with the ability of the antenna to send the pressure signals 685 and other signals externally. In the present aspect, the antenna can be configured to send signals, including the pressure signals 685, over a cellular network. However, in other aspects, signals can be sent from the pressure monitoring unit 185 over wifi, ethernet, Bluetooth®, or any other suitable wireless technology. The pressure monitoring unit 185 may be configured to report the pressure data externally continually, at user-defined intervals, or may be configured to report the pressure data solely when an anomaly occurs, such as a spike in pressure.

In some aspects, the antenna can also allow an operator to remotely control the operation of the flushing system 100. For example, in aspects comprising the solenoid-operated adjustable flow valve 145, the antenna can allow the operator to wirelessly control the solenoid 146 (shown in FIG. 1B) to selectively orient the adjustable flow valve 145 in the open, closed, and partially-open configurations. As described above, the antenna can be wirelessly connected to an app or program on the remote operation device 610 through which the operator can control the flushing system 100. In such aspects, it may not be necessary to include the Bluetooth® controller 190 in the flushing system 100. Furthermore, in some aspects, the adjustable flow valve 145 can also be programmed to automatically open and close periodically for routine flushing of the fluid system. In example aspects, when the adjustable flow valve 145 moves to the open or partially open configuration, allowing fluid to flow through the flushing system 100, the pressure of the fluid can drop and a pressure signal 685 can be sent by the antenna relaying the pressure drop information to the designated external electronic device(s) 620. In some aspects, the external electronic device(s) 620 can be or can include the remote operation device 610. Similarly, the pressure of the fluid can increase when the adjustable flow valve 145 moves to the closed configuration, and a pressure signal 685 can sent relaying the pressure increase information to the designated external electronic device(s) 620.

According to example aspects, the antenna may allow for remote control of various other features of the flushing system 100. Furthermore, in addition to pressure information, the antenna may be configured to communicate information related to other aspects of the flushing system 100 or the fluid therein to one or more external electronic device(s) 620. For example, the flushing system 100 may comprise a temperature sensor 184 configured to detect a temperature of the fluid and the antenna can be configured to send a temperature signal representative of the detected temperature to the designated electronic device(s) 620. In the present aspect, the temperature sensor 184 can be housed with the pressure sensor 182 and can be wired to the pressure monitoring unit 185 by the wire 183. Example aspects of the flushing system 100 may further comprise various other sensors, detectors, and/or measurement tools for sensing, detecting, and/or measuring other properties of the fluid, such as, for example, fluid quality, flow rate, pH level, chlorine level, disinfectant level, turbidity, and the like. The antenna can communicate information related to detected fluid property or properties via a fluid property signal. The antenna can also be configured to communicate information such as the concentration of the dechlorination substances (e.g., sodium sulfite, ascorbic acid) within the dechlorination unit 170, a status of the strainer in the adjustable flow valve 145, etc. In aspects wherein the Bluetooth® controller 190 is also provided, the Bluetooth® controller 190 may allow for remote control the same or different features of the flushing system 100 and/or communication of the same or different information.

According to example aspects, the pressure monitoring unit 185 can be mounted to the sidewall enclosure 120 by a pressure monitor bracket 310 and the Bluetooth® controller 190 can be mounted to the sidewall enclosure 120 by one or more mounting tabs 320. In the present aspect, the Bluetooth® controller 190 can be mounted to a first one of the sidewalls 122a of the sidewall enclosure 120 and the pressure monitoring unit 185 can be mounted to a second one of the sidewalls 122b. In other aspects, the Bluetooth® controller 190 and sidewall enclosure 120 can be mounted at any other suitable location within the interior cavity 115, including any location on the sidewall enclosure 120, lid 425 (shown in FIG. 4), base 129 (shown in FIG. 1B), and fluid routing assembly 130 (shown in FIG. 1A). As shown, example aspects of the pressure monitor bracket 310 comprise a bracket ring 312 and a bracket mounting flange 314. The bracket ring 312 can wrap around a body 386 of the pressure monitoring unit 185 and a head 388 of the pressure monitoring unit 185 can rest on the bracket ring 312. The bracket mounting flange 314 can abut the second sidewall 122b of the sidewall enclosure 120 and can define one or more fastener holes 316 formed therethrough, as shown. A fastener such as, for example, a screw, can extend through each of the fastener holes 316 and can engage the second sidewall 122b to mount the pressure monitor bracket 310 to the sidewall enclosure 120. Example aspects of the Bluetooth® controller 190 can comprise two of the mounting tabs 320 formed monolithically with the Bluetooth® controller 190, and the mounting tabs 320 can abut the first sidewall 122a of the sidewall enclosure 120. In other aspects, the mounting tabs 320 can be formed separately from the Bluetooth® controller 190 and attached thereto. Each of the mounting tabs 320 can define a fastener hole 326 formed therethrough, and a fastener, such as a screw, for example, can extend through each of the fastener holes 326 of the mounting tabs 320 and can engage the first sidewall 122a to mount the Bluetooth® controller 190 to the sidewall enclosure 120. In other aspects, the Bluetooth® controller 190 and pressure monitoring unit 185 can be secured to the housing 110 or elsewhere in the interior cavity 115 by any other suitable attachments mechanisms known in the art.

FIG. 4 illustrates a top perspective view of the housing 110 with the lid 425 covering access opening 128 (shown in FIG. 1A) to prevent access to the interior cavity 115 (shown in FIG. 1A). In example aspects, the lid 425 may be configured to rest on a rim or stops of the sidewall enclosure 120 to support the lid 425 proximate to the upper end 124 of the sidewall enclosure 120. In other aspects, a friction fit may be defined between the lid 425 and sidewall enclosure 120 to secure the lid 425 in position at the upper end 124, and in still other aspects, the housing 110 can define any other suitable configuration for retaining the lid 425 at the upper end 124 of the sidewall enclosure 120. As described above, in example aspect, the lid 425 may be removable from the sidewall enclosure 120 to uncover the access opening 128 and allow access to the interior cavity 115. For example, the lid 425 may be removed for the manual operation of the inlet and outlet shutoff valves 212,222 (shown in FIG. 2), for obtaining fluid samples from the sampling port 135 (shown in FIG. 1A), for replacing the strainer in the adjustable flow valve 145 (shown in FIG. 1A), for adding additional dechlorination tablets to the dechlorination unit 170 shown in FIG. 1A), for repairing or replacing any of the components housed within the interior cavity 115, or for any other suitable reason. Example aspects of the lid 425 may comprise a handle or handles to facilitate lifting the lid 425 away from the sidewall enclosure 120. Moreover, in some aspects, a tool may be required to remove the lid 425 in order to prohibit manual removal of the lid 425 and prevent unintentional removal of the lid 425 and/or tampering with the flushing system 100. In other aspects, the lid 425 may not be removable from housing 110.

Figure 5:
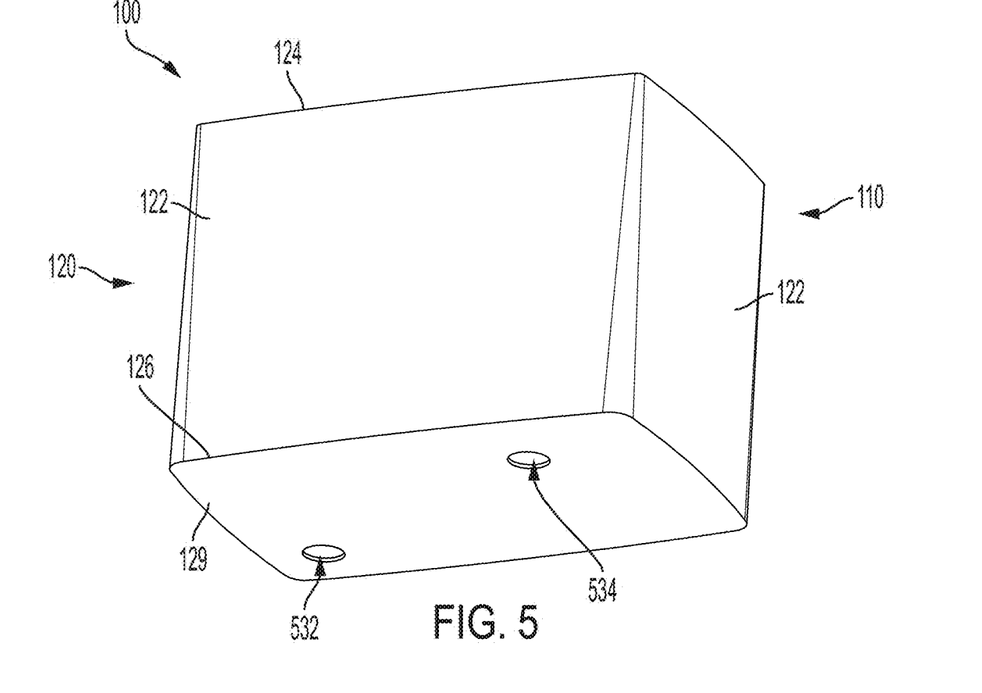
FIG. 5 is a bottom perspective view of the housing of FIG. 4.

FIG. 5 illustrates a bottom perspective view of the housing 110, illustrating the base 129 oriented at the lower end 126 of the sidewall enclosure 120. In some aspects, the base 129 can be monolithically formed with sidewall enclosure 120, and in other aspects, the base 129 can be separately formed from the sidewall enclosure 120 and attached thereto. As such, some example aspects of the base 129 can be removable from the sidewall enclosure 120, while in other aspects, the base 129 is not removable. As shown, example aspects of the base 129 can define the inlet opening 532 formed therethrough through which the inlet conduit 252 (shown in FIG. 2) can extend and the outlet opening 534 formed therethrough through which the outlet conduit 262 (shown in FIG. 2) can extend. Other aspects of the base 129 may comprise additional openings to allow additional components of the flushing system 100, or other systems, to extend into and/or out of the interior cavity 115 (shown in FIG. 1A).

FIG. 6 is a system diagram illustrating a method of operating the flushing system 100, according to an example aspect of the disclosure. Example aspects of the method can include providing the flushing system 100 comprising the fluid routing assembly 130 (shown in FIG. 1A) and the control device 175, wherein the fluid routing assembly 130 can comprise the valve 143. The valve can be configurable in the open configuration, wherein fluid is permitted to flow through the fluid routing assembly 130, and a closed configuration, wherein the fluid is prohibited from flowing through the fluid routing assembly 130. The method can further comprising remotely sending a control signal 615 to the control device 175. For example, the control signal 615 can be sent by the remote operation device 610. Example aspects of the method can also comprise actuating the valve 143 between the open configuration and closed configuration with the control device 175 in response to the control signal 615, wherein, in some aspects, the control device 175 can wirelessly actuate the valve 143 by sending an actuation signal 645 to the valve 143. In some aspects, the method can further comprise detecting a pressure of the fluid with the pressure sensor 182, and sending the pressure signal 685 with the control device 175, the pressure signal 685 representative of the pressure detected by the pressure sensor 182. According to example aspects, the pressure signal 685 can be sent to an external electronic device 620 or devices, and in some aspects, the external electronic devices(s) 620 can be or can comprise the remote operation device 610. In example aspects, the pressure sensor 182 can send pressure data wirelessly to the control device 175, while in other aspects, the pressure sensor 182 can be wired to the control device 175 and can transmit data to the control device 175 through a pressure sensor wire 640, as shown.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A remote-operated flushing system comprising:
    a fluid routing assembly comprising a valve, the valve configurable in an open configuration, wherein fluid is permitted to flow through the fluid routing assembly, and a closed configuration, wherein the fluid is prohibited from flowing through the fluid routing assembly;
    a control device configured to actuate the valve between the open configuration and closed configuration;
    a remote operation device wirelessly connected to the control device and configured to remotely operate the control device to control the actuation of the valve between the open configuration and the closed configuration;
    a housing defining an interior cavity and comprising a sidewall enclosure and a base disposed at a bottom end of the sidewall enclosure; and
    an inlet pathway configured to route the fluid from a fluid system into the remote-operated flushing system and an outlet pathway configured to route the fluid out of the remote-operated flushing system;
    wherein:
        the valve is disposed in the interior cavity of the housing;
        the inlet pathway comprises an inlet conduit extending into the interior cavity through an inlet opening in the base; and
        the outlet pathway comprises an outlet conduit extending into the interior cavity through an outlet opening in the base.

2. The remote operated flushing system of claim 1, wherein the remote- operated flushing system comprises:
    a sensor configured to detect a fluid property of the fluid within the fluid routing assembly, wherein the control device is configured to wirelessly send a signal representative of the fluid property detected by the sensor.

3. The remote-operated flushing system of claim 2, wherein the sensor is a pressure sensor configured to detect a pressure of the fluid in the fluid routing assembly, and wherein the control device is configured to send a pressure signal representative of the pressure detected by the pressure sensor.

4. The remote-operated flushing system of claim 2, further comprising a pressure monitoring unit wired to the pressure sensor, the pressure monitoring unit comprising a processing unit and an antenna, the processing unit configured to process pressure data from the pressure sensor and to relay the pressure data to the antenna, the antenna configured to send the pressure signal.

5. The remote-operated flushing system of claim 2, wherein the sensor is a temperature sensor configured to detect a temperature of the fluid in the fluid routing assembly, and wherein the control device is configured to send a temperature signal representative of the temperature detected by the temperature sensor.

6. The remote-operated flushing system of claim 2, wherein the sensor and control device are oriented within the housing, and wherein the remote operation device is oriented outside of the housing.

7. The remote-operated flushing system of claim 6, wherein:
    the housing further comprising a lid:
    the sidewall enclosure defines an access opening allowing access to the interior cavity; and the lid is configurable in a closed configuration, wherein the lid covers the access opening, and an open configuration, wherein the lid is removed from the housing and the access opening is uncovered to permit access to the interior cavity.

8. The remote-operated flushing system of claim 1, wherein the fluid routing assembly further comprises a backflow preventer configured to allow the fluid to flow in a first direction through the fluid routing assembly and to prevent the fluid from flowing in an opposite second direction through the fluid routing assembly.

9. The remote-operated flushing system of claim 1, wherein the fluid routing assembly further comprises a sampling port, the sampling port comprising a sampling conduit configured to dispense a sample of the fluid in the fluid routing assembly.

10. A remote-operated flushing system comprising:
a fluid routing assembly comprising a valve, the valve configurable in an open configuration, wherein fluid is permitted to flow through the fluid routing assembly, and a closed configuration, wherein the fluid is prohibited from flowing through the fluid routing assembly;
a housing defining an interior cavity and comprising a sidewall enclosure and a base disposed at a bottom end of the sidewall enclosure; and
an inlet pathway configured to route the fluid from a fluid system into the remote-operated flushing system and an outlet pathway configured to route the fluid out of the remote-operated flushing system;
wherein:
the valve is disposed in the interior cavity of the housing;
the inlet pathway comprises an inlet conduit extending into the interior cavity through an inlet opening in the base; and
the outlet pathway comprises an outlet conduit extending into the interior cavity through an outlet opening in the base.

11. The remote-operated flushing system of claim 10, wherein the remote-operated flushing system comprises:
a pressure monitoring system, the pressure monitoring system comprising:
a pressure sensor mounted to the fluid routing assembly and configured to detect a pressure of the fluid within the fluid routing assembly; and
a pressure monitoring unit configured to wirelessly send a pressure signal representative of the pressure detected by the pressure sensor, the pressure monitoring unit further configured to wirelessly receive a control signal from a remote operation device and to actuate the valve between the open configuration and closed configuration in response to the control signal.

12. The remote-operated flushing system of claim 11, wherein the pressure monitoring unit comprises a processing unit and an antenna, the processing unit configured to process pressure data received from the pressure sensor and to relay the pressure data to the antenna, the antenna configured to send the pressure signal and to receive the control signal from the remote operation device.

13. The remote-operated flushing system of claim 11, further comprising a temperature sensor configured to detect a temperature of the fluid in the fluid routing assembly, and wherein the pressure monitoring unit is configured to send a temperature signal representative of the temperature detected by the temperature sensor.

14. The remote-operated flushing system of claim 11, the housing further comprising a lid, wherein the valve and the pressure monitoring system is oriented within the housing.

15. The remote-operated flushing system of claim 11, wherein the pressure monitoring unit is mounted to the housing by a pressure monitor bracket, the pressure monitor bracket comprising a bracket wall, a fastener hole formed through the bracket wall, a fastener configured to extend through the fastener hole and to engage the housing to mount the pressure monitoring unit to the housing.

16. The remote-operated flushing system of claim 10, wherein the fluid routing assembly further comprises a backflow preventer configured to allow the fluid to flow in a first direction through the fluid routing assembly and to prevent the fluid from flowing in an opposite second direction through the fluid routing assembly.

17. The remote-operated flushing system of claim 11, wherein the fluid routing assembly further comprises a sampling port, the sampling port comprising a sampling conduit configured to dispense a sample of the fluid in the fluid routing assembly.

18. A method of operating a flushing system comprising:
accessing a flushing system comprising a fluid routing assembly, a housing defining an interior cavity and comprising a sidewall enclosure and a base disposed at a bottom end of the sidewall enclosure, an inlet conduit extending into the interior cavity through an inlet opening defined in the base, an outlet conduit extending into the interior cavity through an outlet opening defined in the base, and a control device, the fluid routing assembly comprising a valve disposed within the interior cavity of the housing, the valve being configurable in an open configuration, wherein fluid is permitted to flow through the fluid routing assembly, and a closed configuration, wherein the fluid is prohibited from flowing through the fluid routing assembly;
remotely sending a control signal to a control device; and
actuating the valve between the open configuration and closed configuration with the control device in response to the control signal.

19. The method of claim 18, further comprising:
detecting a pressure of the fluid with a pressure sensor; and
sending a signal with the control device, the signal representative of the pressure detected by the pressure sensor.

20. The method of claim 19, further comprising:
detecting a temperature of the fluid with a temperature sensor; and
sending a signal with the control device, the signal representative of the temperature detected by the temperature sensor.

21. The method of claim 19, wherein the inlet conduit is connected to a fluid system and the outlet conduit is connected to a fluid discharge location.

22. The method of claim 18, further comprising dechlorinating the fluid by routing the fluid through a dechlorination unit of the flushing system.

* * * * *